(No Model.)

R. T. BRANKSTON
TRUNNION BEARING FOR ORDNANCE, &c.

No. 378,282. Patented Feb. 21, 1888.

Witnesses
Baltus D. Jong
Edward C. Davidson

Inventor
R. T. Brankston
By attys
Baldwin, Hopkins & Peyton

UNITED STATES PATENT OFFICE.

RALPH T. BRANKSTON, OF ELSWICK WORKS, NEWCASTLE-UPON-TYNE, ENGLAND, ASSIGNOR TO W. G. ARMSTRONG, MITCHELL & CO., (LIMITED,) OF SAME PLACE.

TRUNNION-BEARING FOR ORDNANCE, &c.

SPECIFICATION forming part of Letters Patent No. 378,282, dated February 21, 1888.

Application filed June 1, 1887. Serial No. 239,973. (No model.) Patented in Italy December 31, 1886, No. 20,838.

*To all whom it may concern:*

Be it known that I, RALPH THEW BRANKSTON, a subject of the Queen of Great Britain, residing at Elswick Works, Newcastle-upon-Tyne, England, engineer, have invented certain new and useful Improvements in Trunnion-Bearings for Ordnance and other Heavy Mechanism, (for which I have received Letters Patent in Italy, No. 20,838, dated December 31, 1886,) of which the following is a specification.

The improvements relate to means for reducing friction at the bearings of gun-trunnions to facilitate the turning of the gun on such trunnions, while at the same time keeping the trunnions solidly supported, as heretofore, in bearings of large dimensions, and able to withstand the pressure brought upon them when the gun is fired. Like arrangements are applicable in mounting the axes or trunnions of other mechanism which at times has to support heavy loads or strains, but which at other times it is desirable to be able to turn readily. To do this I, in addition to providing the gun or mechanism with trunnions capable of supporting a heavy strain, also provide other or auxiliary bearings adapted only for supporting the weight of the gun or mechanism itself, and not the load or strain, these additional bearings being made to take the greater part of the weight of the gun or mechanism, and to be so formed that the trunnions turn in or upon them with but little friction. The drawings annexed show ways in which this may be effected.

Figure 1:
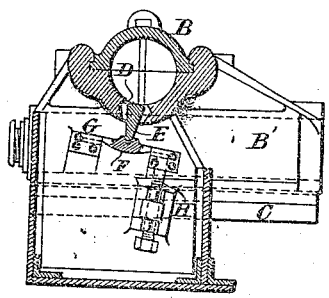
Figure 2:
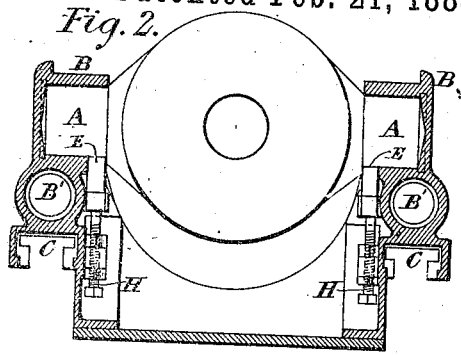
Figure 3:
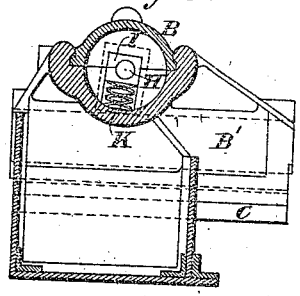
Figure 4:
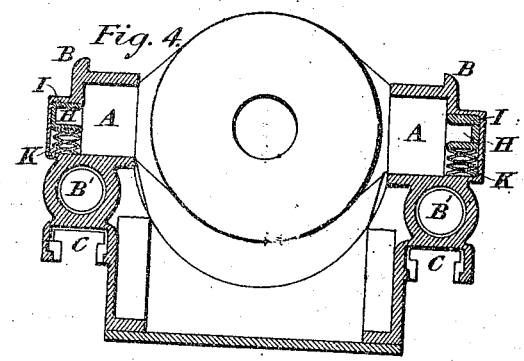
Figure 5:
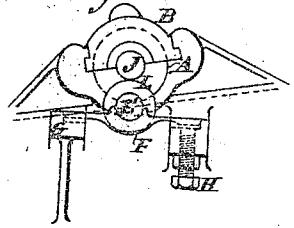
Figure 6:
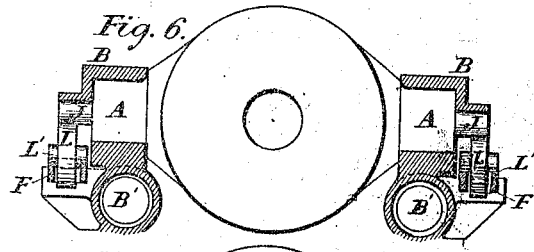
Figure 7:
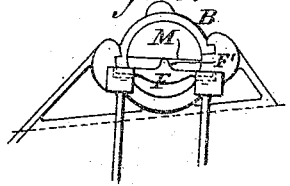
Figure 8:
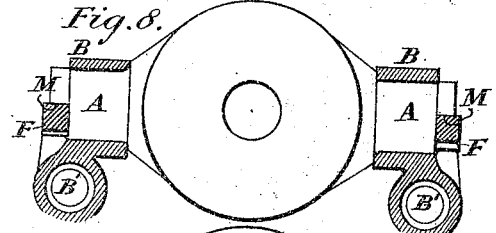
Figure 9:
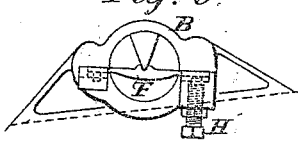
Figure 10:
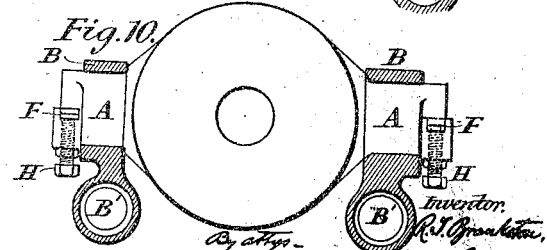

Figures 1 and 2 are vertical sections of trunnion-bearings for a gun in which the subsidiary or additional bearing is formed by a rocking lever held by a spring against the under side of the trunnion. Figs. 3 and 4 are vertical sections of a modification in which each trunnion has a trunnion of small diameter projecting from its end and is supported in a bearing sustained by a spring. Figs. 5 and 6 are vertical sections of a modification in which the small trunnions projecting from the main trunnions rest on the top of the circumference of a friction-wheel. Figs. 7 and 8 are vertical sections of a modification in which a flat surface on the under side of a projection from the end of the trunnion rests on a knife-edge. Figs. 9 and 10 are vertical sections of a modification in which a projection from the end of the trunnion is formed into a knife-edge to rest on a bearing held up to it by a spring.

In Figs. 1 and 2, A A are the main trunnions of a gun, resting in the main or ordinary trunnion-bearings, B, forming part of a gun carriage or mounting, provided with compressor-cylinders B', and formed at C to slide upon two parallel bars or surfaces, in the ordinary manner. A recess is made at the bottom of the main bearing at D, and in this recess the small rocking pillar E of the auxiliary bearing is lodged. The lower end of the rocking pillar is rounded to a small radius, and rests in a recess formed to receive it on the top of a spring-bar, F. This bar at one end rests upon a fixed support, G, and at its other end on a screw, H, which passes through a lug on the gun-carriage. By turning this screw the rocking pillar is pressed upward until it supports the greater part of the weight of the gun. The upper end of the pillar is curved to a radius nearly equal to the length of the pillar, so that between it and the trunnion there is only rolling friction. The movement of the foot of the pillar in its bearing is very slight, so that the power required to turn the gun is very slight.

In the modification shown at Figs. 3 and 4, A A are the main trunnions of the gun, supported in trunnion-bearings B. H H are small auxiliary trunnions projecting from the ends of the trunnions A. These are received into bearing-blocks I, which are lodged in guides provided to receive them at the ends of the main bearings. K K are springs beneath the auxiliary bearing-blocks I. These springs are of sufficient strength to almost but not quite lift the gun by the auxiliary trunnions.

In the modification shown at Figs. 5 and 6 the small auxiliary trunnions J are made to rest upon the periphery of wheels L, the axes L' of which rest in cavities in spring-bars F, which, as in Figs. 1 and 2, can be pressed upward by screws H.

In the modification shown at Figs. 7 and 8,

M is a flat horizontal surface on the under side of a projection from the end of the main trunnion and in a plane passing through the center of the trunnion. This surface at its center rests on a rounded projection or knife-edge, F', which stands up from a spring-bar, F. The spring F is supported at its two ends, and is adjustable either by a screw, H, as before, or by introducing filling-pieces beneath it. The adjustment is so made that the spring-bars take almost the entire weight of the gun.

In the modification shown at Figs. 9 and 10 the knife-edge bearing is on the under side of the projection from the end of the main trunnion, and it rests in a groove or recess in the spring-bar F.

Having now particularly described and ascertained the nature of my said invention and in what manner the same is to be performed, I declare that what I claim is—

The combination of the trunnions, the bearings or annular supports surrounding the trunnions, and the auxiliary spring-sustained supports exerting upward pressure on the trunnions, and thereby relieving the bearings or annular supports from weight, substantially as set forth.

R. T. BRANKSTON.

Witnesses:
T. PURVIS,
WM. JOHN GREY,
    *Notary Public.*